(12) United States Patent
Park et al.

(10) Patent No.: US 8,661,152 B2
(45) Date of Patent: Feb. 25, 2014

(54) METHOD AND APPARATUS FOR REDUCING DETERIORATION OF A QUALITY OF EXPERIENCE OF A MULTIMEDIA SERVICE IN A MULTIMEDIA SYSTEM

(75) Inventors: Kyung-Mo Park, Seoul (KR);
Chul-Keun Kim, Gwangji-si (KR);
Doug-Young Suh, Seongnam-si (KR);
Jae-Yeon Song, Seoul (KR); Yong-Hun Lee, Suwon-si (KR)

(73) Assignees: Samsung Electronics Co., Ltd (KR);
University-Industry Cooperation Group of Kyung Hee University (KR)

( * ) Notice: Subject to any disclaimer, the term of this patent is extended or adjusted under 35 U.S.C. 154(b) by 257 days.

(21) Appl. No.: 13/213,680

(22) Filed: Aug. 19, 2011

(65) Prior Publication Data
US 2012/0047280 A1  Feb. 23, 2012

(30) Foreign Application Priority Data

| Aug. 19, 2010 | (KR) | 10-2010-0080554 |
| Oct. 6, 2010 | (KR) | 10-2010-0097550 |
| Oct. 15, 2010 | (KR) | 10-2010-0101067 |

(51) Int. Cl.
*G06F 15/16* (2006.01)
*H04N 7/173* (2011.01)

(52) U.S. Cl.
USPC .............................. 709/231; 709/233; 725/88

(58) Field of Classification Search
USPC ...................................... 709/231, 233; 725/88
See application file for complete search history.

(56) References Cited

U.S. PATENT DOCUMENTS

| 6,937,770 | B1 * | 8/2005 | Oguz et al. ..................... 382/235 |
| 2010/0027976 | A1 | 2/2010 | Smith et al. |
| 2010/0191860 | A1 | 7/2010 | Krikorian et al. |
| 2011/0185058 | A1 * | 7/2011 | Priddle et al. .................. 709/224 |
| 2011/0231883 | A1 * | 9/2011 | Maynard et al. ................. 725/88 |
| 2011/0268427 | A1 * | 11/2011 | Brelay et al. ................... 386/343 |
| 2011/0317760 | A1 * | 12/2011 | Chen et al. ............... 375/240.12 |
| 2011/0317771 | A1 * | 12/2011 | Chen et al. ............... 375/240.25 |
| 2012/0016965 | A1 * | 1/2012 | Chen et al. .................... 709/219 |
| 2012/0042089 | A1 * | 2/2012 | Chen et al. .................... 709/231 |
| 2013/0074132 | A1 * | 3/2013 | Hasek et al. .................... 725/93 |

FOREIGN PATENT DOCUMENTS

| EP | 000812112 A2 * | 12/1997 |
| KR | 1020090030779 | 3/2009 |
| KR | 1020100086178 | 7/2010 |

* cited by examiner

*Primary Examiner* — Larry Donaghue
(74) *Attorney, Agent, or Firm* — The Farrell Law Firm, P.C.

(57) ABSTRACT

A method and an apparatus for reducing a deterioration of a Quality of Experience (QoE) in a multimedia service. The method includes reproducing a first multimedia stream by the multimedia device, receiving a command for reproducing a second multimedia stream during the reproducing of the first multimedia stream, and reproducing the second multimedia stream with reference to information regarding a unit image that is independently decoded from the second multimedia stream. The information regarding the unit image includes information regarding a number of unit images per unit time included in the second multimedia stream.

20 Claims, 10 Drawing Sheets

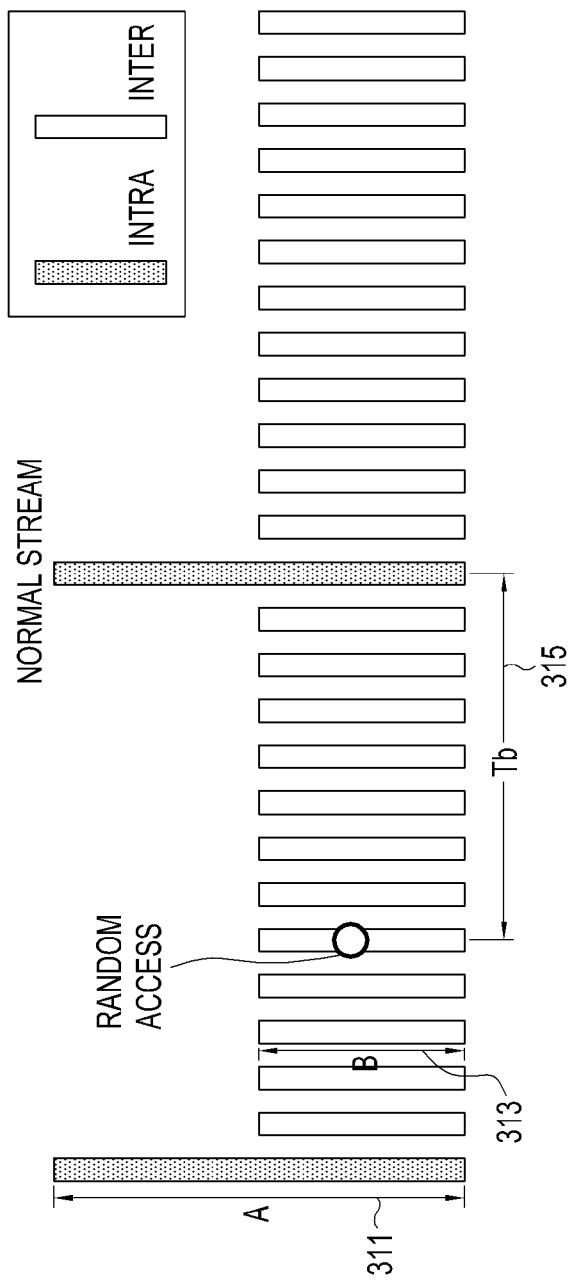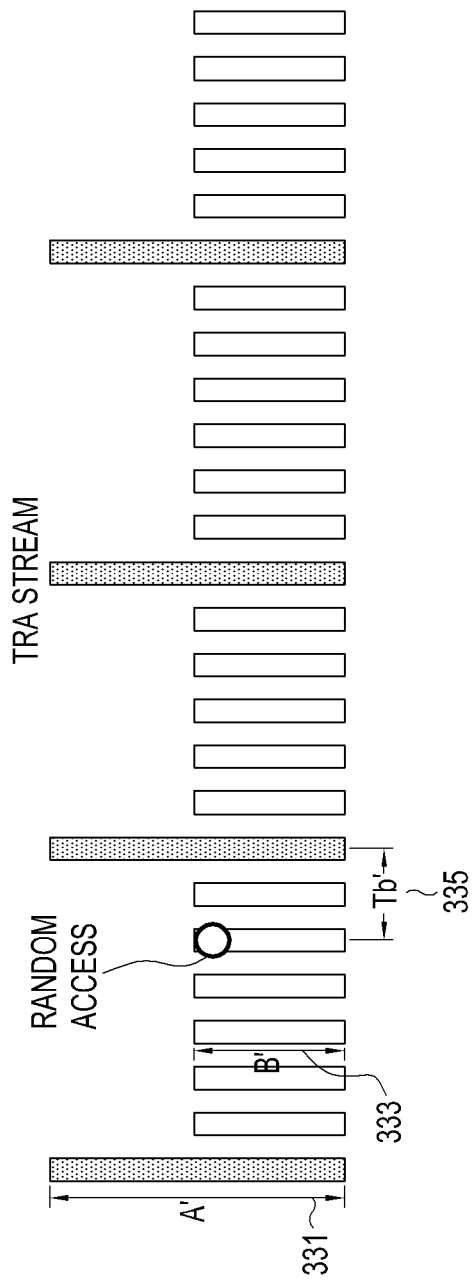
FIG.3A (PRIOR ART)
FIG.3B

METHOD AND APPARATUS FOR REDUCING DETERIORATION OF A QUALITY OF EXPERIENCE OF A MULTIMEDIA SERVICE IN A MULTIMEDIA SYSTEM

PRIORITY

This application claims priority under 35 U.S.C. §119(a) to Korean Patent Application Serial Nos. 10-2010-0080554, 10-2010-0097550, and 10-2010-0101067, which were filed in the Korean Industrial Property Office on Aug. 19, 2010, Oct. 6, 2010, and Oct. 15, 2010, respectively, the entire content of each of which is incorporated herein by reference.

BACKGROUND OF THE INVENTION

1. Field of the Invention

The present invention relates generally to a method and an apparatus for improving a service quality in a multimedia system, and more particularly to a method and an apparatus for reducing a deterioration of a Quality of Experience (QoE) in a multimedia service.

2. Description of the Related Art

In a Hypertext Transfer Protocol (HTTP)-based multimedia streaming service (hereinafter, referred to as a "multimedia service"), a stream is segmented in a unit of a predetermined time and a corresponding stream is transferred to a client in response to a client request. In this process, there is a limitation in decreasing a delay caused by initial buffering.

FIG. 1 illustrates a conventional fast forward operation in a HTTP-based multimedia service. Specifically, FIG. 1 illustrates that when a reproduction position within content is changed or content is changed during the use of the multimedia service, a delay is generated by buffering.

Referring to FIG. 1, T0 101 represents a time at which a fast forward is started and T1 103 represents a time at which the fast forward is completed in the multimedia service. A solid line 105 represents data before T0 101 and a solid line 107 represents data after T1 103. A dotted line represents a threshold 109 of a buffer. In order to start the reproduction of the multimedia, an amount of data that is larger than the threshold 109 of the buffer is required. Accordingly, when the amount of data in the buffer is larger than the threshold 109 before T0 101, and when the fast forward is started at T0 101 and then the fast forward is stopped at T1 103, the amount of data in the buffer decreases below the threshold 109.

Tb 111 represents a time required for the data in the buffer to reach the threshold 109. No multimedia is reproduced during Tb 111. Accordingly, Tb 111 is commonly referred to as a start-up delay, during which a user cannot receive the multimedia service. Consequently, a QoE of the service is deteriorated during Tb 111.

FIG. 2 illustrates an example of a delay according to a coding unit in a conventional multimedia service.

Referring to FIG. 2, when a random access occurs during an Inter (or Inter frame) 203 that is a unit image that cannot be independently decoded in a stream, a delay occurs until an Intra (or Intra frame) 201 appears that is a unit image that can be independently decoded in the stream. That is, a random access or a trick mode is available based on the unit image (Intra 201), which can be independently decoded.

SUMMARY OF THE INVENTION

Accordingly, the present invention has been made to solve the above-described problems occurring in the prior art, and to provide at least the advantages described below.

An aspect of the present invention is to provide a method and an apparatus for minimizing deterioration of a QoE caused by a delay from a change of a reproduction position within content or a change of content in a multimedia service.

In accordance with an aspect of the present invention, a method of providing a multimedia streaming service in a multimedia device is provided. The method includes reproducing a first multimedia stream by the multimedia device; receiving a command for reproducing a second multimedia stream during the reproducing of the first multimedia stream; and reproducing the second multimedia stream with reference to information regarding a unit image that is independently decoded from the second multimedia stream. The information regarding the unit image includes information regarding a number of unit images per unit time included in the second multimedia stream.

In accordance with another aspect of the present invention, an apparatus for providing a multimedia streaming service is provided. The apparatus includes a display unit for displaying reproduced multimedia; and a controller for reproducing a first multimedia stream through the display unit, receiving a command for reproducing a second multimedia stream during the reproducing of the first multimedia stream, and reproducing the second multimedia stream through the display unit with reference to information regarding a unit image that is independently decoded from the second multimedia stream. The information regarding the unit image includes information of a number of unit images per unit time included in the second multimedia stream.

BRIEF DESCRIPTION OF THE DRAWINGS

The above and other aspects, features, and advantages of the present invention will be more apparent from the following detailed description taken in conjunction with the accompanying drawings, in which:

FIG. 3A a normal stream a conventional multimedia service;

FIG. 3B illustrates a Trick mode and Random Access (TRA) stream according to an embodiment of the present invention;

DETAILED DESCRIPTION OF EMBODIMENTS OF THE INVENTION

Figure 1:
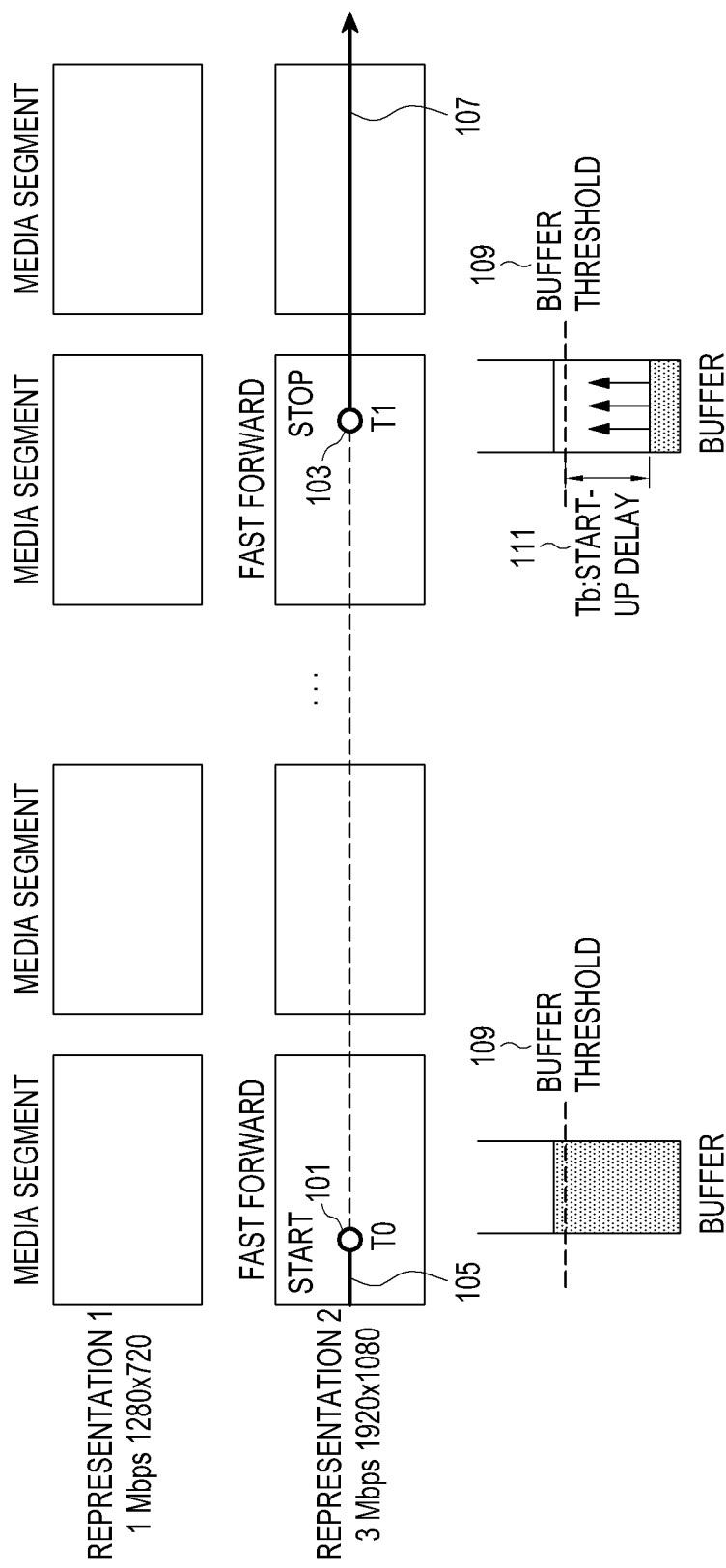
FIG. 1 illustrates a fast forward operation in a conventional multimedia service.
Figure 2:
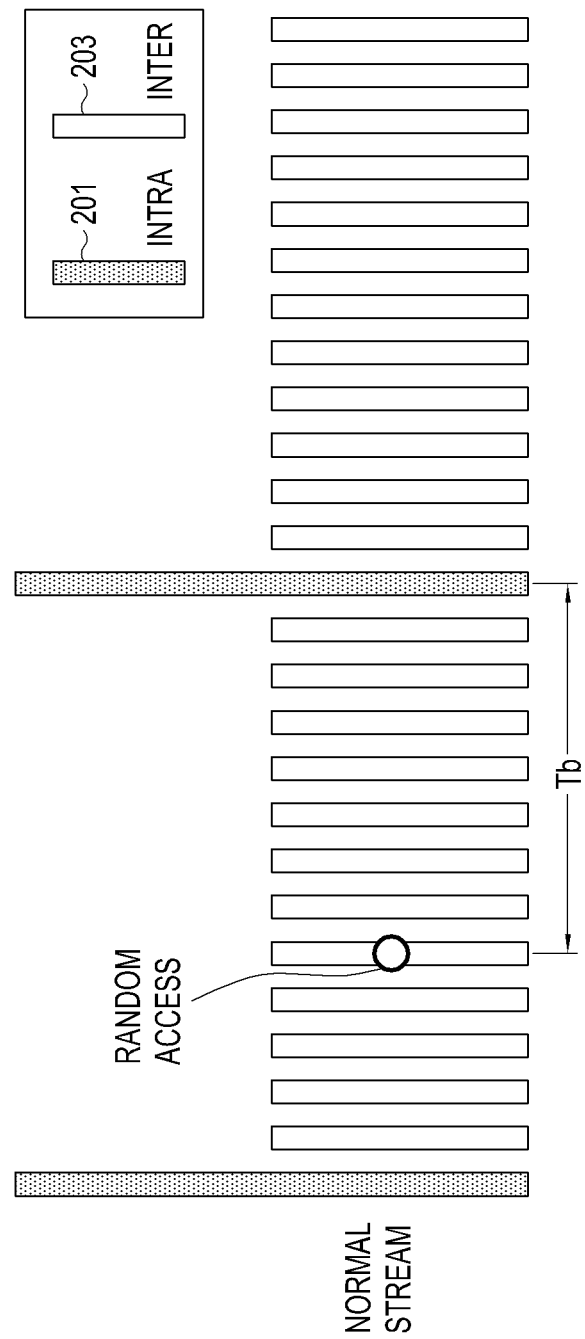
FIG. 2 illustrates an example of a delay according to a coding unit in a conventional multimedia service.

Various embodiments of the present invention will be described in detail below with reference to the accompanying drawings In the following description, detailed explanations of known related functions and constitutions may be omitted to avoid unnecessarily obscuring the subject manner of the present invention.

Herein, an event in which a user moves a temporal position of contents to be reproduced forward or backward, during a multimedia service, e.g., changes tracks or scenes, is referred to as a "random access", and an event in which a user changes a speed or a temporal direction of a reproduction of content, e.g., fast forwards or rewinds, is referred to as a "trick mode". When a user performs a random access or a trick mode, previously received data should be deleted from a buffer and buffering should be performed for newly received data. However, during this process, delay occurs, deteriorating a QoE of the multimedia service.

In accordance with an embodiment of the present invention, an additional multimedia stream is provided, which is specialized for a change of a reproduction position within content or a change of content in a multimedia service provided through various wired/wireless broadcasting systems. The specialized multimedia stream is encoded in a small unit in order to minimize a delay. For example, an image group of a frame, i.e., a size of a Group of Pictures (GOP) and a period of Intra, is encoded to be short. As a result, a buffering speed is fast.

In accordance with another embodiment of the present invention, an index is provided for cross-referencing between content so as to rapidly respond to a change of content. Using the index to change between content, interaction is minimized, and thus, delay associated with changing the content is also minimized.

In accordance with an embodiment of the present invention, when a user changes a reproduction position within content, i.e., random access, or changes content, i.e., trick mode, a previously received multimedia stream is switched to a specialized multimedia stream as proposed in the present invention, in order to minimize deterioration of a QoE according to a delay. When the change of the reproduction position within the content or the change of the content is completed, the specialized multimedia stream is switched back to the existing multimedia stream.

In accordance with an embodiment of the present invention, deterioration of a QoE is minimized by using a multimedia stream specialized for changing a reproduction position within content or changing content.

In order to minimize delay, a unit, i.e., a size of the GOP and a period of Intra, which can be independently decoded, are small and short, respectively. Here, shortening the period of the decodable unit, i.e., the unit image (Intra or Intra frame), means that the number of the unit images per unit time included in a multimedia stream is increased.

FIG. 3A illustrates a conventional normal stream, and FIG. 3B illustrates a Trick mode and Random Access (TRA) stream according to an embodiment of the present invention. The normal stream may be used in an image with high quality and the TRA stream may be used in an image with relatively low quality. The numbers of normal streams and the numbers of TRA streams may be one or more.

Referring to FIGS. 3A and 3B, the period of Intra of the TRA stream shorter than the normal stream. Accordingly, when the random access is tried at a same time point, a delay using the normal stream is Tb 315 is much greater than a delay using the TRA stream is Tb' 335. A size of Intra in the normal stream is A 311, a size of Inter in the normal stream is B 313, a size of Intra in the TRA stream is A' 331, and a size of Inter in the TRA stream B' 333, wherein A>A' and B>B', such that the sizes 331 and 333 of Intra and Inter in the TRA stream for a fast buffering are smaller than the sizes 311 and 313 of Intra and Inter in the normal stream, respectively.

Figure 4:
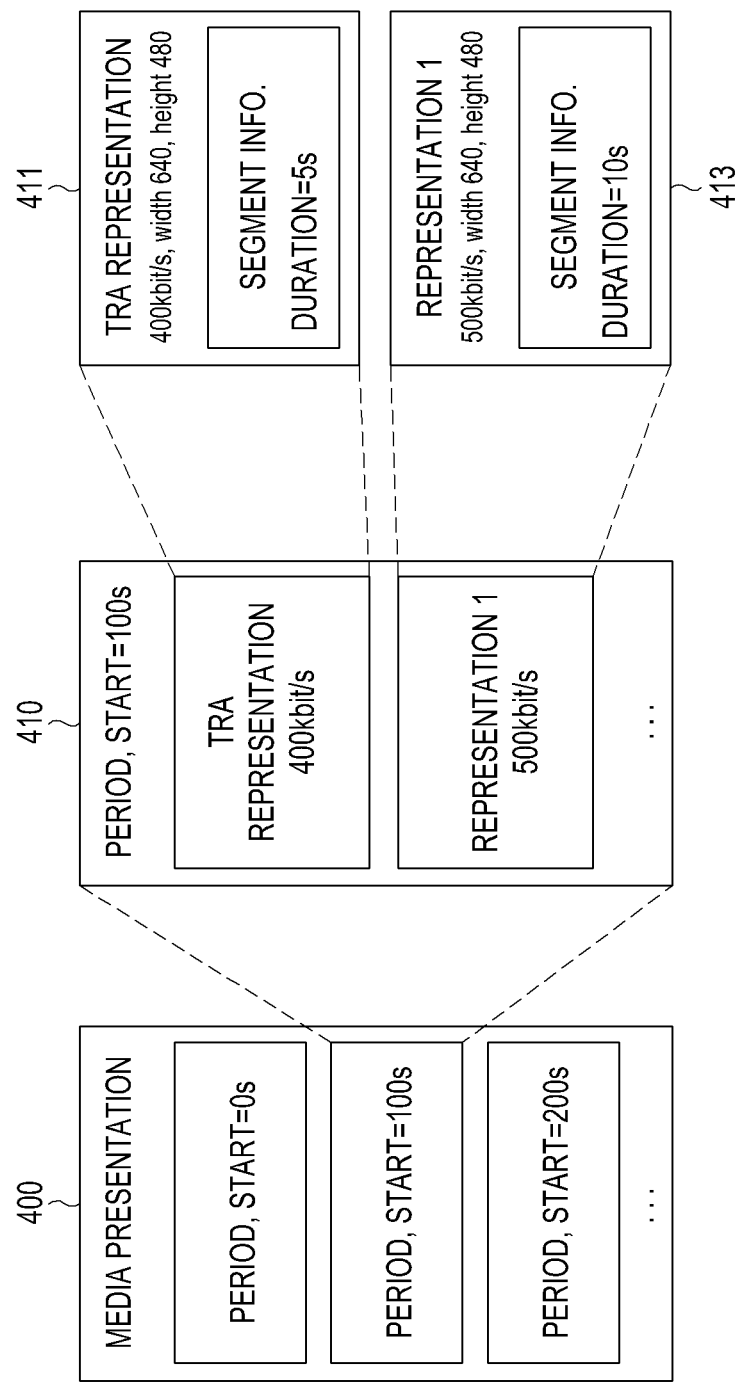
FIG. 4 illustrates an HTTP-based multimedia service according to an embodiment of the present invention.

FIG. 4 illustrates an HTTP-based multimedia service according to an embodiment of the present invention.

Referring to FIG. 4, reference numbers, 400, 410, 411, and 413 indicate structures of media representations. A period of a representation 1 413 in a normal stream is 10 seconds, but a period of a TRA representation 411 in the TRA stream according to the present invention is 5 seconds, which is shorter than that of the normal stream. Further, a bandwidth of the representation 1 413 in the normal stream is 500 kbit/s, while a bandwidth of the TRA representation 411 in the TRA stream is 400 kbit/s, which is lower than that of the normal stream. Therefore, by using the TRA stream, the delay after seeking is shortened.

Figure 5:
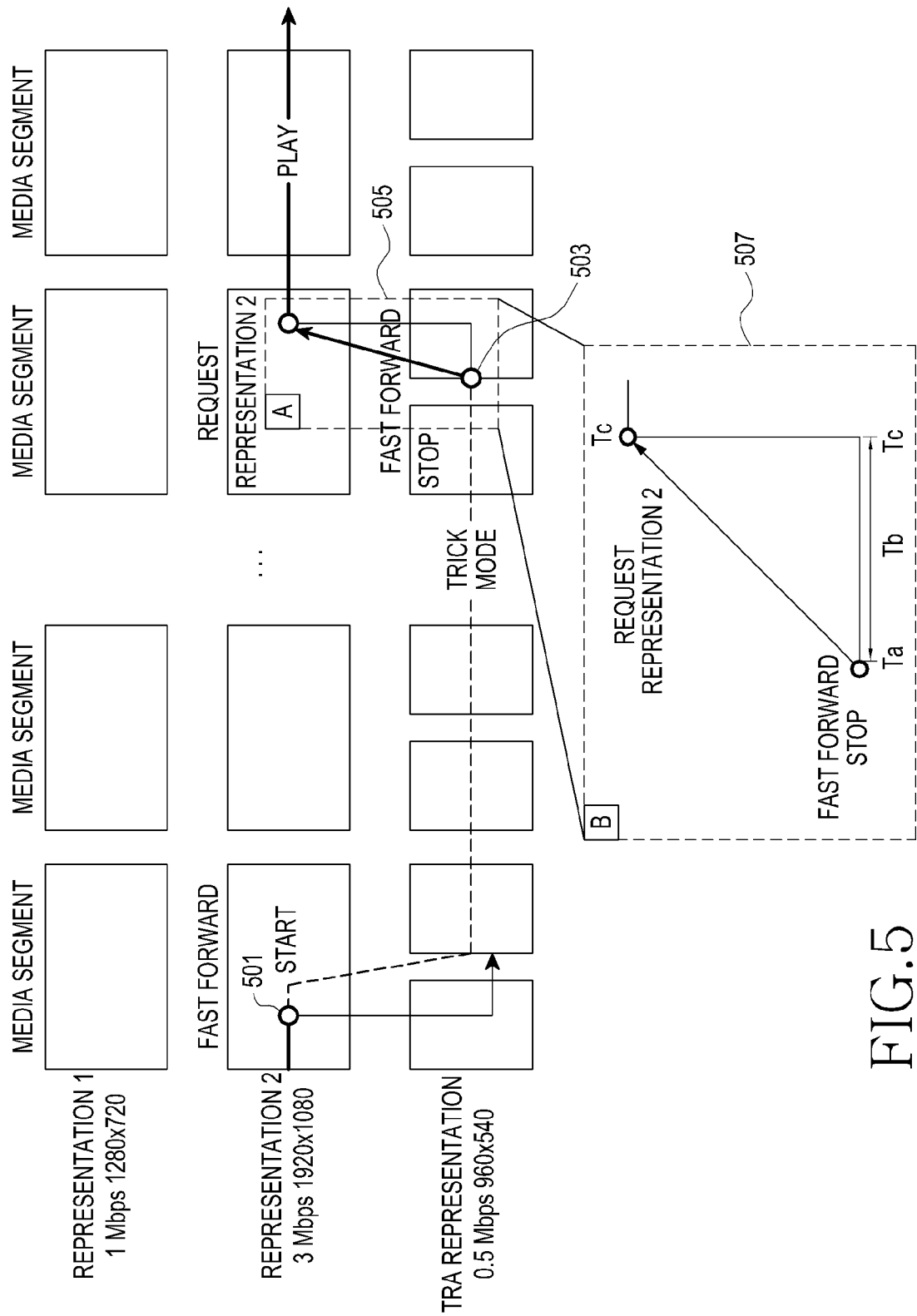
FIG. 5 illustrates a fast forward operation using an additional multimedia stream (TRA representation) in an HTTP-based multimedia service according to an embodiment of the present invention.

FIG. 5 illustrates a fast forward operation using the TRA stream in an HTTP-based multimedia service according to an embodiment of the present invention.

Referring to FIG. 5, a solid line represents a general reproduction section and a dotted line represents a fast forward section. A time point 501 represents a time at which the fast forward is started and a time point 503 represents a time at which the fast forward is stopped. Block A 505 represents a switching section between the TRA representation and the representation 2, and Block B 507 depicts Block A 505 in more detail.

Ta in Block B 507 is a time at which the fast forward is stopped. When the fast forward is stopped at Ta, a request for the representation 2 is made in order to switch the TRA representation to the representation 2. In this regard, the request for the representation 2 corresponding to Tc, not Ta, is made. The TRA representation is displayed during the buffering, after the request. When the buffering is completed, the TRA representation is switched to the representation 2 and the representation 2 is displayed. Tb, i.e., the time period from Ta to Tc, represents a time for buffering representation 2, after making the request for the representation 2. Because the TRA representation is displayed during Tb, a start-up delay experienced by a user, after the seeking, i.e., trick mode, is shorter than the conventional method. If the conventional method is used, it is impossible to display the representation 2 during Tb.

Figure 6:
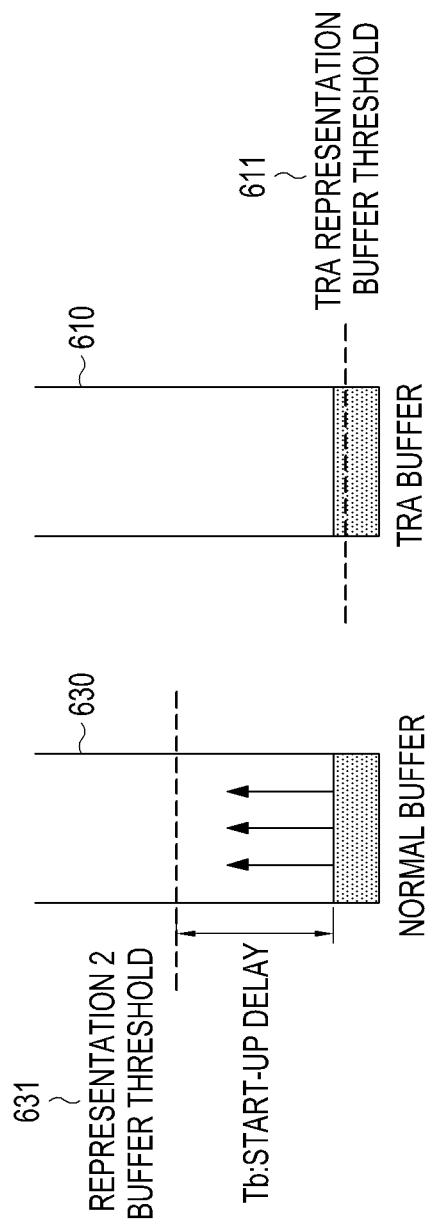
FIG. 6 illustrates a conventional buffer and a TRA buffer method according to an embodiment of the present invention.

FIG. 6 illustrates a conventional buffer and a TRA buffer method according to an embodiment of the present invention.

Referring to FIG. 6, a buffer 610 buffers the TRA representation and a buffer 630 buffers the representation 2 of FIG. 5. A threshold 611 of the buffer 610 of the TRA representation is smaller than a threshold 631 of the buffer 630 of the representation 2 because the TRA representation has the smaller bandwidth and the shorter period of Intra than those of the representation 2. The threshold 611 of the buffer 610 of the TRA representation may be transmitted to a client for a buffer management of the client.

As illustrated in the example of FIG. 6, the buffer 630 of the representation 2 will not reach the threshold 631, while the buffer 610 of the TRA representation already exceeds the threshold 611, and the TRA representation can be displayed until the buffer 630 of the representation 2 reaches the threshold 631. As a result, the user experiences less start-up delay, reducing deterioration of the QoE.

The algorithm provided below represents an example of transmission of threshold information of the buffer 610 of the TRA representation. A threshold of the buffer 610 of the TRA representation may be added to index (sidx) information of the TRA representation in a form of a new structure or index (sidx) information itself of the existing representation, e.g., the representation 2, may be contained in index (sidx) information of the TRA representation. Further, as represented in Table 1 below, the index (sidx) information may be added to index (sidx) information of the TRA representation in a form of a new attribute of Media Presentation Description (MPD), which is information on a header of a multimedia stream, to be transmitted.

Through the threshold or index (sidx) information, the client can perform a buffer management function that minimizes start-up delay.

Algorithm of Transmitting Threshold Information of Buffer of TRA Representation

Figure 7:
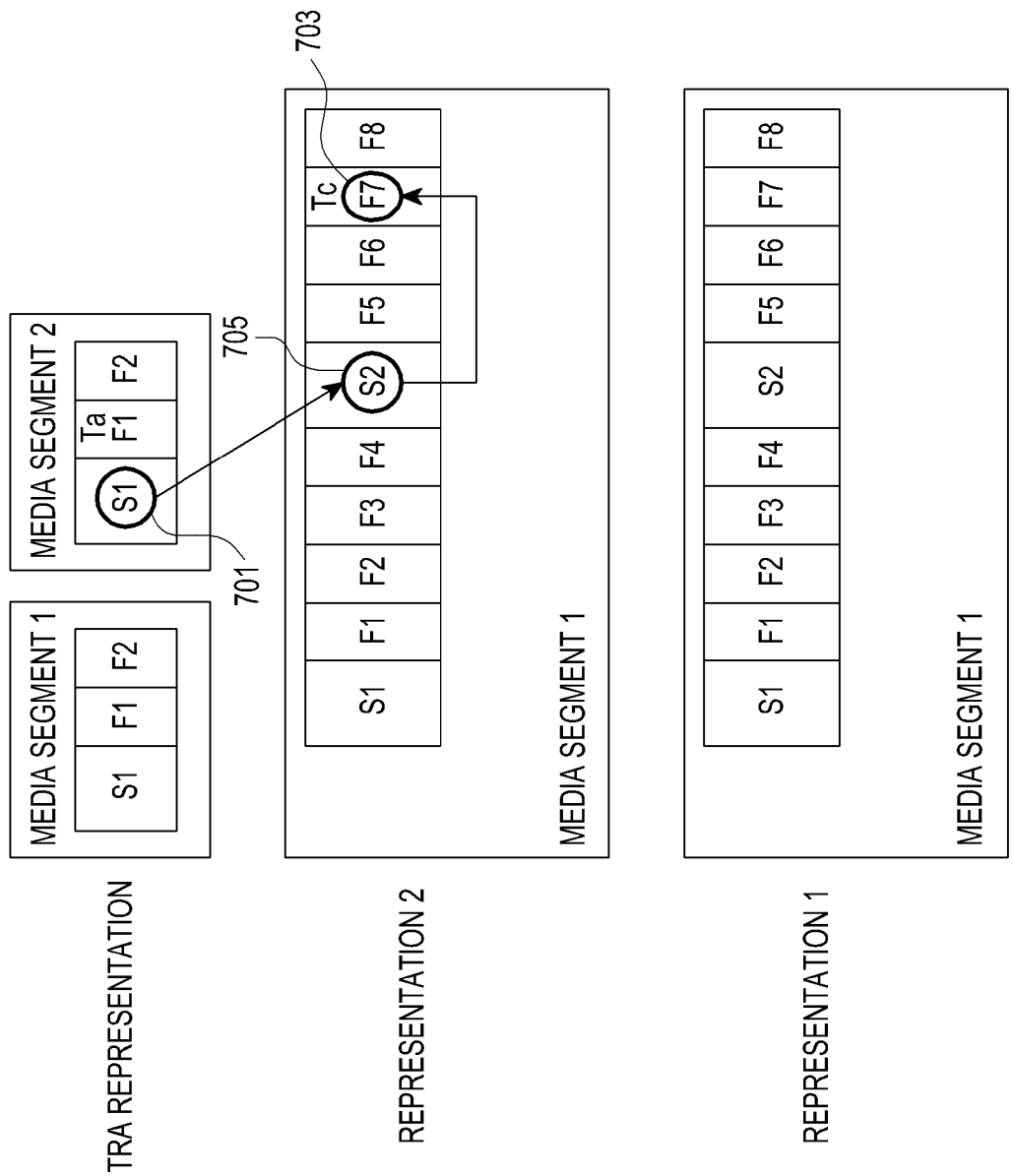
FIG. 7 illustrates a method of switching between representations in an HTTP-based multimedia service according to an embodiment of the present invention.

```
aligned(8) class SegmentIndexBox extends FullBox('sidx'. version. 0) {
    unsigned int(32) reference_track_ID;
    unsigned int(16) track_count;
        unsigned int(16) reference_count;
    for (i=1; i<= track_count; i++)
    {
        unsigned int(32)     track_ID;
        if (version==0)
        {
            unsigned int(32)     decoding_time;
        } else
        {
            unsigned int(64)     decoding_time;
        }
    }
    for(i=1; i <= reference_count; i++)
    {
        bit (1)          reference_type;
``` sponding to Tc at Ta, index information of the representation 2 is contained in the TRA representation. For example, as illustrated in FIG. 7, when information of S2 705 of the representation 2 is included in S1 (sidx 1) 701 of a media segment 2 of the TRA representation, it is possible to acquire S2 using S1 (sidx 1) 701 and request F7 703 using information of F7 703 of S2 705.

In accordance with an embodiment of the present invention, an additional multimedia stream is provided, which is specialized for changing a reproduction position within content or changing content. When a user changes a reproduction position within content or changes content, an existing multimedia stream is switched to the multimedia stream proposed herein, and when the change of the reproduction position or the content is completed, the multimedia stream is switched back to the existing multimedia stream. In order to perform the switching operation, the multimedia stream proposed in the present invention should be identified.

Table 1 may be used to identify a multimedia stream in an HTTP-based multimedia service according to the present invention.

In Table 1, 'TRArepresentationURL' is explicitly expressed in the MPD in order to switch a currently served representation to a TRA representation specialized for the trick mode and the random access. As described in this example, the existing representation should be switched to the TRA representation by adding an identifier for the TRA representation proposed in the present invention to the MPD. The TRA representation should also be switched to the existing representation.

TABLE 1

| Url | E | 0...N | CM Must be present if the UrlTemplate element is not present. | Provides a set of explicit URL(s) for Segments. Note: The URL element may contain a byte range. |
|---|---|---|---|---|
| sourceURL | A | | M | The source string providing the URL |
| range | A | | O | The byte range restricting the above URL. If not present, the resources referenced in the sourceURL are unrestricted. The format of the string shall comply with the format as specified in section 12.2.4.1 |
| TRArepresentationURL | A | | O | The URL of TRA representation is provided. |
| TRArepresentationThreshold | A | | O | A threshold of a buffer of TRA representation is provided. |

-continued

```
        unsigned int(31)     reference_offset;
        unsigned int(32)     subsegment_duration;
        bit(1) contains_RAP;
        unsigned int(31)     rap_count;          //added
        for(j=1;j<=rap_count;j++)                //added
        {
            unsigned(32) RAP_delta_time;         //moved
            unsigned(32) Sample_start_offset;    //added
                unsigned(32) Sample_length;      //added
        }
    }
    unsigned(32)            TRArepresentationThreshold;
}
```

FIG. 7 illustrates a method of a switching between representations in an HTTP-based multimedia service according to an embodiment of the present invention.

As described above with reference to FIG. 5, in order for a user to make a request for data of the representation 2 corre- In order to efficiently request the data of the representation 2 corresponding to Tc, at Ta, without duplication of the data as illustrated in FIGS. 5 and 7, information of another representation or reference information of each stream is used. For example, it is possible to prevent a duplicate receipt and a decoding by using time information of the stream. Accordingly, index (sidx) information of another representation is contained in the index (sidx) information of the TRA representation.

An example of an algorithm for adding a value of a position of an index (sidx) of another representation to the index (sidx) information of the TRA representation is provided below. A value of a position of an index (sidx) of another representation may be added to the index (sidx) information of the TRA representation or index (sidx) information itself of another representation may be added to the index (sidx) information of the TRA representation. For example, the index (sidx) information for requesting the data of the representation without the duplication of the data is a value of a position for the index (sidx) of another representation and a reproduction time for reproducing a corresponding stream.

```
aligned(8) class SegmentIndexBox extends FullBox('sidx', version,
TRArepresentation,0) {
    unsigned int(16) Representation_count;
    RAPindicator int(32) offset;
    PresentationTime int(32) time;
        if(TRArepresentation)
        {
            for(i=1; i <= Representation_count; i++)
            {
                unsigned int(32) ref_Sidx;
            }
        }
}
```

The variables in the algorithm represent the following:

1) TRArepresentation (flag): This variable is for identifying a representation. When TRArepresentation (flag) is true, it represents the TRA representation, and when TRArepresentation (flag) is false, it represents a normal representation. This variable may be expressed in a flag form expressing true or false for an addition function based on an attribute of a normal representation depending on occasions.

2) Representation_count: This variable represents a total number of representations other than the TRA representation.

3) ref_Sidx: This variable represents a point of an index (sidx) for switching the TRA representation to a normal representation.

Table 2 below represents another example for identifying a multimedia stream in an HTTP-based multimedia service. In Table 1, a user can select an appropriate multimedia stream in the TRA through a URL of the multimedia appropriate to the TRA. However, in Table 2, a user can identify a multimedia stream appropriate to the TRA through characteristic information, such as Random Access Point (RAP) period information of the multimedia stream.

In Table 2 below, property information such as information of the RAP period may be added in a form of a new attribute of the MPD to be transmitted.

TABLE 2

| Representation | E | 1 ... N | M | This element contains a description of a Representation. |
|---|---|---|---|---|
| bandwidth | A | | M | The minimum bandwidth of a hypothetical constant bitrate channel in bits per second (bps) over which the representation can be delivered such that a client, after buffering for exactly minBufferTime can be assured of having enough data for continuous playout. |
| id | A | | M | Provides a unique identifier for this Representation within the Period. |
| width | A | | O | Specifies the horizontal resolution of the video media type in an alternative Representation, counted in pixels. |
| height | A | | O | Specifies the vertical resolution of the video media type in an alternative Representation, counted in pixels. |
| RAPperiod | A | | O | It indicates the period of RAP or the frequency of RAP per second. |

Figure 8:
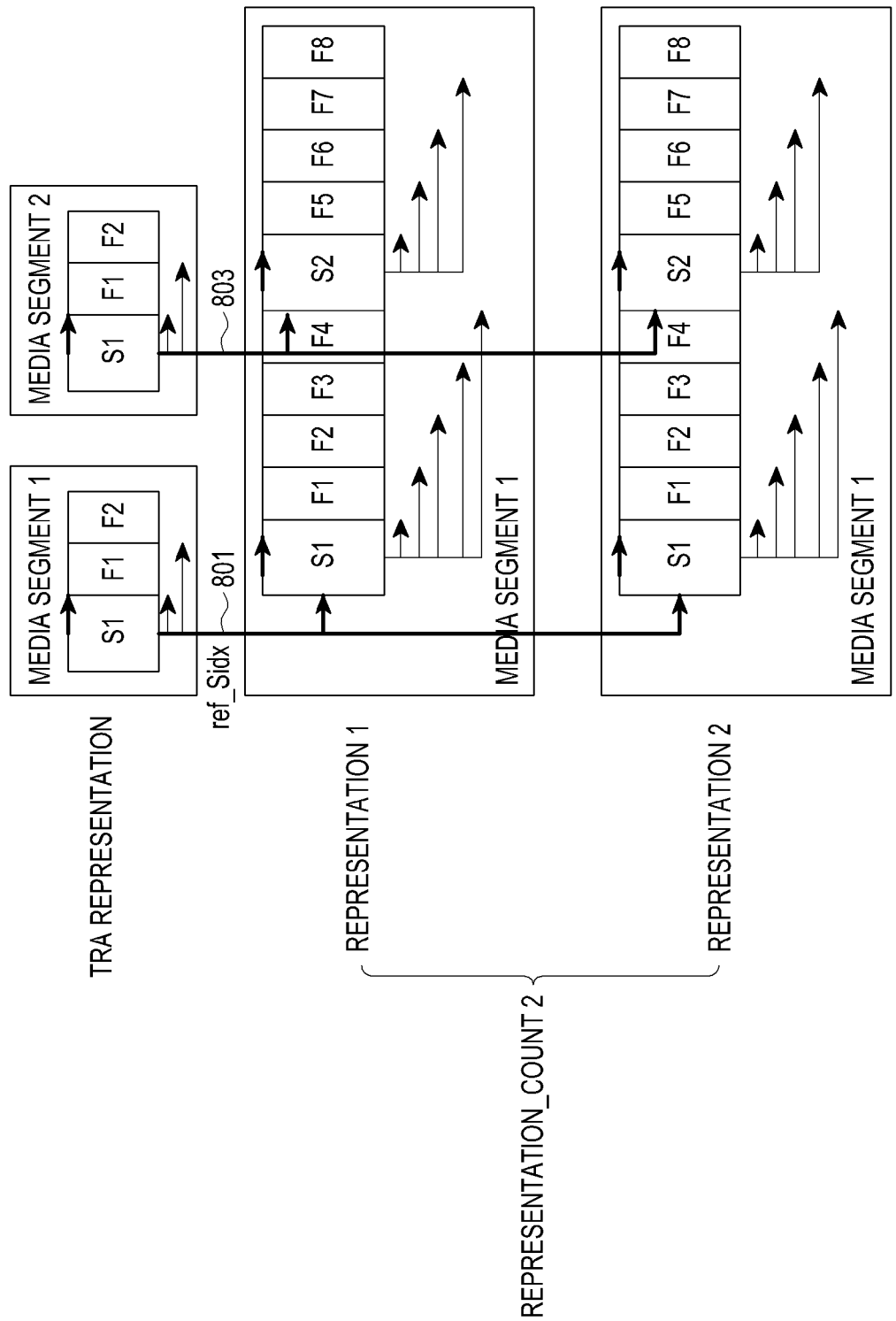
FIG. 8 illustrates a method of switching using an extended index (sidx) according to an embodiment of the present invention.

FIG. 8 illustrates a method of switching using an extended index (sidx) according to an embodiment of the present invention. Specifically, FIG. 8 illustrates an example of an extended sidx for switching the TRA representation to the existing representation in an HTTP-based multimedia service, wherein a value of the Representation_count is 2.

Referring to FIG. 8, each of solid lines 801 and 803 represents a reference index (ref_Sidx) that is index (sidx) information of the existing representation, which the index (sidx) of the TRA representation should include. In FIG. 8, the index (sidx) of the TRA representation has two reference indexes (ref_Sidx).

Figure 9:
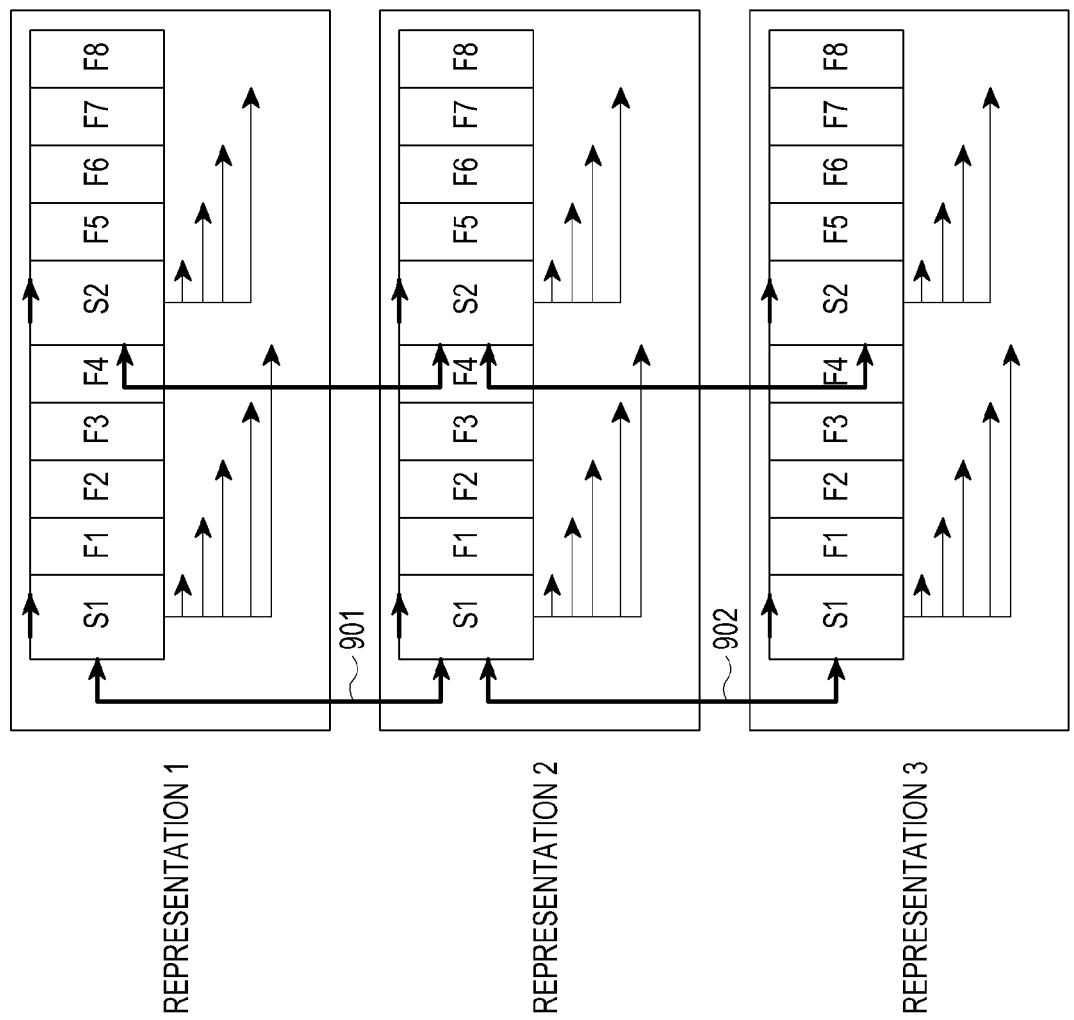
FIG. 9 illustrates a method of switching using an extended index (sidx) for cross-reference according to another embodiment of the present invention.

FIG. 9 illustrates a method of switching using an extended index (sidx) for cross-reference according to another embodiment of the present invention. The example illustrated in FIG. 9 may be applied when a representation for the change of content cannot be additionally used.

Referring to FIG. 9, indication lines 901 and 902 represent index information between the representations. As described above, in FIG. 8, the TRA representation includes all index information of another representation. However, in FIG. 9, each representation only has index information of an adjacent representation, and when a request for a change of content is made, a request for information of another representation is made using the index information of the adjacent representation.

For example, in FIG. 9, the representation 1 has index information of the representation 2 and the representation 2 has index information of the representations 1 and 3. Various methods Other than the method in which each representation has index information of an adjacent representation may be adopted.

An algorithm for the embodiment illustrated in FIG. 9 is provided below.

```
aligned(8) class SegmentIndex (sidx)Box extends FullBox('sidx';
version, ,0) {
    unsigned int(8) REF_Representation_count;
    for(i=1; i <= Representation_count; i++)
    {
        unsigned int(8) ref_Sidx_count;
        for(j=1; j <= ref_Sidx_count; j++)
        {
    unsigned int(31) Sidx_position
        }
    }
}
```

The variables in the algorithm above represent the following.

1) REF_Representation_count: This variable indicates a number of representations, which a reference index should have.

2) ref_Sidx_count: This variable indicates a number of reference Sidxes. That is, the variable indicates a number of reference Sidxes to be included in a media segment of the reference representation.

3) Sidx_position: This variable indicates a position of index information for a change of content. It may be an offset or a byte range, but not a position, of index information depending on occasions.

Figure 10:
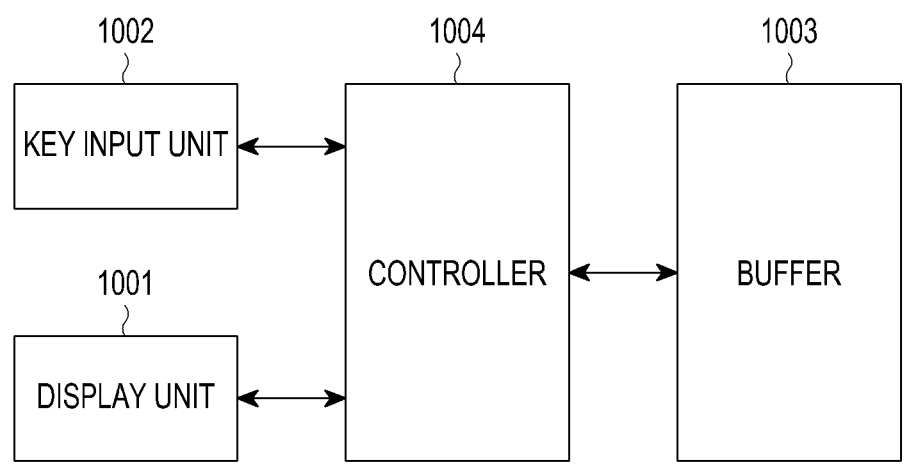
FIG. 10 illustrates a block diagram of a multimedia apparatus for executing a multimedia service according to an embodiment of the present invention.

FIG. 10 is a block diagram of a multimedia apparatus for executing a multimedia service according to an embodiment of the present invention. For example, the multimedia apparatus may be a portable terminal such as a smart phone, Personal Digital Assistant (PDA), Tablet Personal Computer (PC), etc.

Referring to FIG. 10, the multimedia apparatus includes a display unit 1001, a key input unit 1002, a buffer 1003, and a controller 1004. The display unit 1001 displays the multimedia service, the key input unit 1002 receives an input of various commands regarding a reproduction from a user, and the buffer 1003 buffers a multimedia stream. When a specific command related to a reproduction is executed through the key input unit 1002 during a reproduction of a first multimedia stream in the display unit 1001, the controller 1004 controls such that a second multimedia stream is reproduced through the display unit 1001 for a time period necessary for buffering a multimedia stream corresponding to the specific command by the buffer 1003. When the buffering is completed, the controller 1004 controls, such that the multimedia stream corresponding to the specific command is reproduced through the display unit 1001.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of providing a multimedia streaming service in a multimedia device, the method comprising:
    reproducing a first multimedia stream of a content by the multimedia device;
    receiving a command for reproducing a second multimedia stream of the content during the reproducing of the first multimedia stream;
    reproducing, in response to the command for reproducing the second multimedia stream, the second multimedia stream with reference to information regarding a unit image that is independently decoded from the second multimedia stream, the information regarding the unit image including information regarding a number of unit images per unit time included in the second multimedia stream;
    receiving, during the reproduction of the second multimedia stream, a command for resuming reproduction of the first multimedia stream;
    buffering, in response to the command for reproducing the first multimedia stream, the first multimedia stream while reproducing a multimedia stream of the same content other than the first multimedia stream; and
    resuming, upon completion of the buffering of the first multimedia stream, reproduction of the first multimedia stream.

2. The method of claim 1, wherein reproducing the second multimedia stream comprises:
    reproducing the second multimedia stream while stopping reproduction of the first multimedia stream.

3. The method of claim 1,
    wherein the resumption of reproduction of the first multimedia stream is performed with reference to index related information of the first multimedia stream from the second multimedia stream.

4. The method of claim 3, further comprising:
    stopping the reproducing of the second multimedia stream, upon receiving the command for resuming reproduction of the first multimedia stream.

5. The method of claim 1, wherein the number of unit images per unit time included in the second multimedia stream is larger than a number of unit images per unit time included in the first multimedia stream.

6. The method of claim 1, wherein the information regarding the unit image is included in Media Presentation Description (MPD) that is information on a header of a multimedia stream.

7. The method of claim 1, wherein the second multimedia stream reproduces an image with a lower quality than that of the first multimedia stream.

8. The method of claim 1, wherein the second multimedia stream reproduces an image with a lower resolution than that of the first multimedia stream.

9. The method of claim 1, wherein the command for reproducing the second multimedia stream includes one of a random access command and a trick mode command.

10. An apparatus for providing a multimedia streaming service, comprising:
    a display unit for displaying reproduced multimedia; and
    a controller for reproducing a first multimedia stream of a content through the display unit, receiving a command for reproducing a second multimedia stream of the content during the reproducing of the first multimedia stream, reproducing, in response to the command for reproducing the second multimedia content, the second multimedia stream through the display unit with reference to information regarding a unit image that is independently decoded from the second multimedia stream, receiving, during the reproduction of the second multimedia stream, a command for resuming reproduction of the first multimedia stream, buffering, in response to the command for reproducing the first multimedia stream, the first multimedia stream while reproducing a multimedia stream of the same content other than the first multimedia stream, and resuming, upon completion of the buffering of the first multimedia stream, reproduction of the first multimedia stream,
    wherein the information regarding the unit image includes information of a number of unit images per unit time included in the second multimedia stream.

11. The apparatus of claim 10, wherein the controller reproduces, upon receiving the command for reproducing the second multimedia stream, the second multimedia stream while stopping reproduction of the first multimedia stream.

12. The apparatus of claim 10, wherein the controller resumes reproduction of the first multimedia stream with reference to index related information of the first multimedia stream from the second multimedia stream.

13. The apparatus of claim 12, wherein the controller stops reproducing the second multimedia stream, upon receiving the command for resuming reproduction of the first multimedia stream.

14. The apparatus of claim 10, wherein the number of unit images per unit time included in the second multimedia stream is larger than a number of unit images per unit time included in the first multimedia stream.

15. The apparatus of claim 10, wherein the information regarding the unit image is included in Media presentation Description (MPD) that is information on a header of a multimedia stream.

16. The apparatus of claim 10, wherein the second multimedia stream reproduces an image with a lower quality than that of the first multimedia stream.

17. The apparatus of claim 10, wherein the second multimedia stream reproduces an image with a lower resolution than that of the first multimedia stream.

18. The apparatus of claim 10, wherein the command for reproducing the second multimedia stream comprises one of a random access command and a trick mode command.

19. The method of claim 1, wherein buffering the first multimedia stream while reproducing the multimedia stream other than the first multimedia stream comprises:

requesting, from a content provider, the first multimedia stream starting from a resumption time point of the content; and buffering the requested first multimedia stream starting from the resumption time point of the content, wherein the resumption time point of the content is separated from a time point of the content reproduced when the command for resuming reproduction of the first content is received by a time period required to perform the buffering the first content.

20. The apparatus of claim 10, wherein buffering the first multimedia stream while reproducing the multimedia stream other than the first multimedia stream includes requesting, from a content provider, the first multimedia stream starting from a resumption time point of the content, and buffering the requested first multimedia stream starting from the resumption time point of the content, and wherein the resumption time point of the content is separated from a time point of the content reproduced when the command for resuming reproduction of the first content is received by a time period required to perform the buffering the first content.

\* \* \* \* \*